United States Patent [19]

Lewis

[11] 3,722,967
[45] Mar. 27, 1973

[54] LOW HEAT GENERATION TURBINE ENGINE BEARING

[75] Inventor: Harry R. Lewis, Arlington, Va.

[73] Assignee: The United States of America as represent by the Secretary of the Navy

[22] Filed: Oct. 26, 1971

[21] Appl. No.: 191,980

[52] U.S. Cl. ..................................308/187
[51] Int. Cl. ..............................E16c 33/30
[58] Field of Search.........................308/187

[56] References Cited

UNITED STATES PATENTS 2,280,659   4/1942   Muller.................................308/187

FOREIGN PATENTS OR APPLICATIONS 1,163,612   2/1964   Germany........................308/215

Primary Examiner—Charles J. Myhre
Assistant Examiner—F. Susko
Attorney—R. S. Sciascia et al.

[57] ABSTRACT

A low heat generation roller bearing having inner and outer races. Oil is applied to the surface where the rollers and inner race contact by means of an oil jet nozzle. Centrifugal force and rotation of the rollers, forces the oil around the rollers to the outer race. Radial bores extend through the outer race and connect with one or more circumferential grooves to collect and aid in transmission of oil from the outer race. A path is provided to return the oil to an oil sump for scavenging back to an oil supply tank.

14 Claims, 3 Drawing Figures

Patented March 27, 1973 3,722,967

INVENTOR.
HARRY R. LEWIS

LOW HEAT GENERATION TURBINE ENGINE BEARING

BACKGROUND OF THE INVENTION

A. Field of the Invention

The present invention relates generally to bearings, and more particularly to a low heat generation turbine engine bearing.

B. Description of the Prior Art

Conventional bearings of the general type as the bearing of the present invention depend on oil trapped in between the rollers and cage to seep through the narrow clearance between the end rails of the cage lands and the outer race lands. With cold or viscous oil, the high resistance due to oil shearing action creates highly localized heat and roller/cage skid or slip. This problem is especially critical in the high speed bearing application of the advanced technology fan type turbine engines, where bearing speeds have been increased by as much as 25 percent over conventional engines. Without a means of expelling oil after it has performed its function, heat generation will limit engine performance and increase complexity by requiring larger fuel/oil coolers, and more complex shaft, bearing and pump designs, thereby having an adverse affect on engine life and performance.

SUMMARY OF THE INVENTION

The present invention eliminates oil trapping within high speed main shaft roller bearings so that the heat generation due to the drag of captive oil may be reduced over that encountered with conventional flanged outer race type outer land riding roller cage bearings.

OBJECTS OF THE INVENTION

An object of the present invention is to reduce heat generation in a turbine engine bearing which is due to the drag of captive oil within the bearing, and thereby to prevent undesirable bearing geometry changes and other problems caused by high heat generation.

Another object of the invention is to prevent wear metal debris and particulate matter from collecting in the bearing and thereby cause roller and race scoring and denting.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
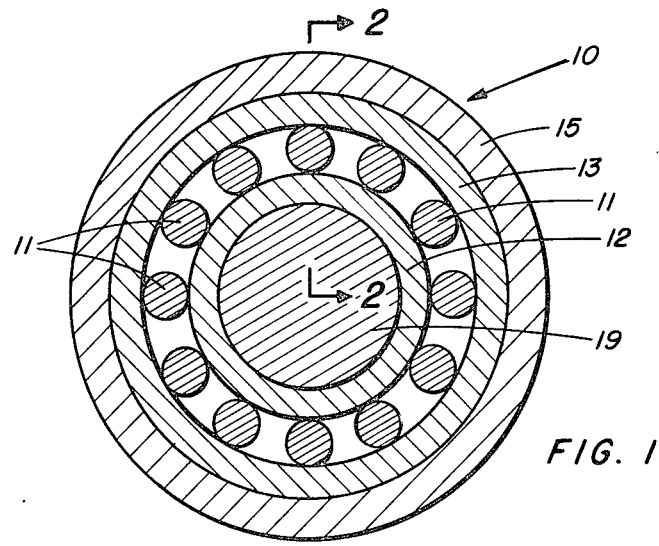
FIG. 1 is a cross-sectional view of the bearing of the present invention.

FIG. 1, which illustrates a preferred embodiment of the invention, shows a bearing 10. Crowned rollers 11 are disposed between inner race 12 and outer race 13. Bearing support flange 15 is mounted in a fixed relationship with a support and rotating means, not shown, for rotating shaft 19.

Figure 2:
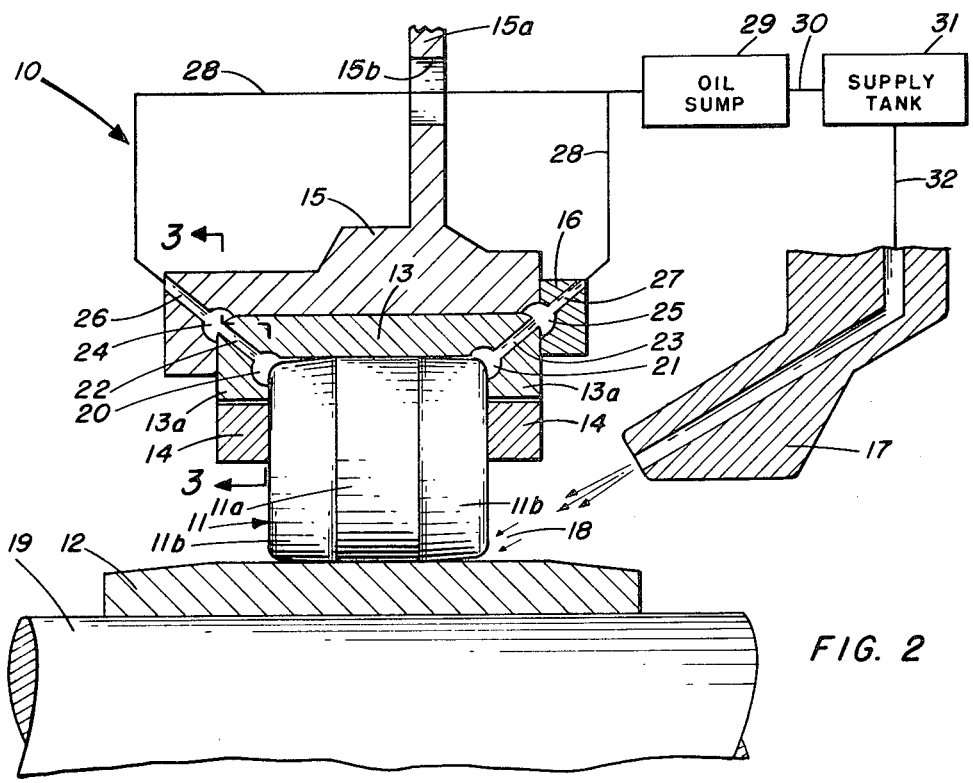
FIG. 2 is a partial cross-sectional view taken along lines 2 — 2 of FIG. 1.

The partial cross-sectional view of FIG. 2 shows the bearing lubricant system of the present invention. Crowned roller 11 has cylindrical portion 11a located centrally thereof and tapered portions 11b at each side thereof. Inner race 12 is disposed about rotating shaft 19, preferably in a pressed fit relationship. Cage 14 is located at the left and right of roller 11 and may include pins (not shown) to hold bearings 11 along a fixed axis with respect to the cage. Bearing support flange 15 is disposed radially about outer race 13 and has projecting portion 15a and openings 15b thereon for attachment to a turbine engine.

Oil 18 from oil jet 17 impinges at the junction of the inner race 12 and roller corner tapered portions 11b. Roller 11 picks up the oil and by rotation and centrifugal force passes it around and through the cage 14 to the outer race 13. By centrifugal force the oil is directed to the outer race corner oil channels 20 and 21 where it passed on to radial bore 22, channel 24, and radial bore 26 on the left, and radial bore 23, channel 25, and radial bore 27 in bearing retainer or lock plate 16 on the right side of bearing 10. The oil is then expelled through oil lines 28 and returned into oil sump 29 for scavenging, either by gravity or by a scavenging sump pump for example, back to oil supply tank 31 through line 30. Line 32 recirculates the oil back to jet 17 for reuse. Oil jet 17 is shown in a simplified form, not showing the details, such as the pump which produces the pressure of the jet. A filter, not shown, is preferably placed in line 28 but may appear at any convenient place in the system.

Figure 3:
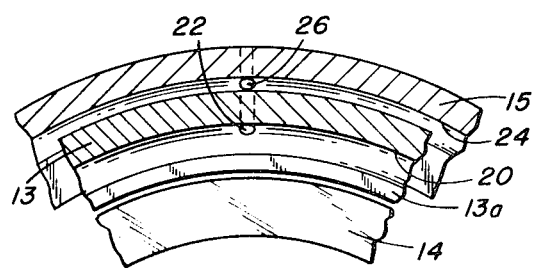
FIG. 3 is a partial cross-sectional view taken along line 3 — 3 of FIG. 2.

FIG. 3 shows annular channel 20 in outer race 13 in communication with radial bore 22 which leads to channel 24 in bearing support flange 15. Channel 24, in turn, communicates with radial bore 26, also in bearing support flange 15. A plurality of radial bores, not shown, like radial bores 22 and 26 connect with annular channels 20 and 24, and communicate finally to line 28. Similarly, on the right side a plurality of radial bores, not shown, corresponding to radial bores 23 and 27 connect with line 28. The radial passageways, including for example radial holes and channels 20 – 27, act as metering devices so that some oil will pass around the roller end 11b and provide an oil film to separate the retainer flanges 13a and rollers 11.

Oil sprayed through fixed oil jet 17 impinges on the inner race 12 to keep it cool so that thermal expansion is controlled within design tolerances. When the rollers pass the oil from the inner race 12 to outer race 13 an elastohydrodynamic film is formed between the load surfaces of the bearing. Without passageways to remove the oil from outer race 13, the oil becomes trapped between the rolling elements, cage 14, and races 12 and 13, due to the minimum clearance between the outer race lands and cage 14. The drag that occurs due to such oil entrapment results in power loss, high heat rejection and roller skidding damage. Also, wear metal debris and particulate matter too small to be collected by the oil filters cause roller and race scoring and denting. The provision of passageways 20 – 28 of the present invention alleviates the problem of oil entrapment and thereby the problem of heat build-up. Also hard damaging particulate matter passes through the rolling elements, cage, and passageways 20 – 28 and thereby prevents scoring, wear, and denting of the bearing parts.

Although other types of bearing members may be used, crowned rollers 11 lend themselves to this design since some oil collects at the tapers 11b and thereby assists in rapid expulsion through the channels and radial holes of outer race 13. Crowned rollers also allow some slight misalignment of the bearing 10 to the rotating shaft and stationary support.

Obviously many modifications and variations of the present invention are possible in light of the above teachings. It is therefore to be understood that, within the scope of the appended claims, the invention may be practiced otherwise than as specifically described.

What is claimed is:

1. A bearing comprising:
   an inner annular race having an outer peripheral bearing surface thereon;
   an outer annular race having an inner peripheral bearing surface and an inner peripheral annular channel thereon;
   at least one roller bearing member rotatably disposed between the inner race and the outer race whereby a tapered surface on said roller bearing member is aligned with said inner peripheral annular channel to provide communication between said inner peripheral annular channel and a space formed between said inner peripheral bearing surface and said tapered surface on said roller bearing member; and
   means in communication with said inner peripheral annular channel for draining lubricant from said bearing, thereby preventing debris or particular matter from collecting and causing scoring or denting of the roller bearing member or the races.

2. The device of claim 1 wherein said draining means comprises at least one radial bore in communication with said inner peripheral annular channel of said outer race.

3. The device of claim 1 including means for applying lubricant to said outer peripheral bearing surface of the inner race.

4. The device of claim 3 wherein said means for applying lubricant is a jet nozzle.

5. The device of claim 2 wherein a second annular channel in communication with said radial bore is disposed radially outwardly from said at least one annular channel.

6. The device of claim 2 including a plurality of radial bores in the outer race.

7. The device of claim 2 wherein said outer race has a radially inwardly extending annular flange thereon.

8. The device of claim 7 wherein said annular channel is disposed in said outer race between said inner peripheral bearing surface and said flange.

9. The device in claim 2 wherein a plurality of channels communicate with said radial bore.

10. The device of claim 9 wherein a plurality of radial bores communicate with said channels.

11. The device of claim 1 wherein lubricant from said draining means communicates with a sump.

12. The device of claim 11 wherein the sump is in communication with a supply tank.

13. The bearing of claim 1 further comprising:
   a second tapered surface on said roller bearing member; and
   a second inner peripheral annual channel in said outer annular race.

14. The bearing of claim 13 wherein said tapered surfaces and inner peripheral annular channels are positioned at each end of said roller bearing member.

* * * * *